(12) United States Patent
Webster et al.

(10) Patent No.: US 8,194,530 B2
(45) Date of Patent: Jun. 5, 2012

(54) DUAL PACKET CONFIGURATION FOR WIRELESS COMMUNICATIONS

(75) Inventors: Mark A. Webster, Indian Harbor Beach, FL (US); Steven D. Halford, Palm Bay, FL (US); Richard D. Roberts, Palm Bay, FL (US)

(73) Assignee: Intellectual Ventures I LLC, Wilmington, DE (US)

( * ) Notice: Subject to any disclaimer, the term of this patent is extended or adjusted under 35 U.S.C. 154(b) by 56 days.

(21) Appl. No.: 11/849,579

(22) Filed: Sep. 4, 2007

(65) Prior Publication Data

US 2007/0297382 A1    Dec. 27, 2007

Related U.S. Application Data

(63) Continuation of application No. 09/586,571, filed on Jun. 2, 2000, now Pat. No. 7,274,652.

(51) Int. Cl.
*H04J 9/00* (2006.01)
(52) U.S. Cl. ............... 370/204; 370/338; 370/341
(58) Field of Classification Search .............. 370/204, 370/338, 341
See application file for complete search history.

(56) References Cited

U.S. PATENT DOCUMENTS

| | | | |
|---|---|---|---|
| 4,703,474 A | 10/1987 | Foschini et al. | |
| 5,241,545 A | 8/1993 | Kazecki et al. | |
| 5,425,050 A | 6/1995 | Schreiber et al. | |
| 5,706,428 A | 1/1998 | Boer et al. | |
| 5,963,592 A * | 10/1999 | Kim | 375/232 |
| 6,067,391 A | 5/2000 | Land | |
| 6,088,327 A * | 7/2000 | Muschallik et al. | 370/210 |
| 6,091,932 A | 7/2000 | Langlais | |

(Continued)

FOREIGN PATENT DOCUMENTS

JP    7245574(A)    9/1995

(Continued)

OTHER PUBLICATIONS van Nee, Richard, "A New OFDM Standard for High Rate Wireless LAN in the 5 GHz Band", 1999, Vehicular Technology Conference, 1999, IEEE VTS 50th, pp. 258-262.*

(Continued)

*Primary Examiner* — Jason Mattis

(57) ABSTRACT

A dual packet configuration for wireless communications including a first portion that is modulated according to a serial modulation and a second portion that is modulated according to a parallel modulation. The serial modulation may be DSSS whereas the parallel modulation may be OFDM. The first portion may include a header, which may further include an OFDM mode bit and a length field indicating the duration the second portion. The first portion may be in accordance with 802.11b to enable dual mode devices to coexist and communicate in the same area as standard 802.11b devices. The dual mode devices can communicate at different or higher data rates without interruption from the 802.11b devices. The packet configuration may include an OFDM signal symbol which further includes a data rate section and a data count section. In this manner, data rates the same as or similar to the 802.11a data rates may be specified between dual mode devices. The first and second portions may be based on the same or different clock fundamentals. For OFDM, the number of subcarriers, pilot tones and guard interval samples may be modified independently or in combination to achieve various embodiments. Also, data subcarriers may be discarded and replaced with pilot tones for transmission. The receiver regenerates the discarded data based on received data, such as using ECC techniques.

50 Claims, 12 Drawing Sheets

U.S. PATENT DOCUMENTS

| | | | |
|---|---|---|---|
| 6,125,103 | A | 9/2000 | Bauml et al. |
| 6,128,276 | A | 10/2000 | Agee |
| 6,344,807 | B1 | 2/2002 | Hassner et al. |
| 6,377,562 | B1 | 4/2002 | Schneider |
| 6,434,119 | B1 | 8/2002 | Wiese et al. |
| 6,438,367 | B1 | 8/2002 | Crawford |
| 6,470,055 | B1 | 10/2002 | Feher |
| 6,493,395 | B1 | 12/2002 | Isaksson et al. |
| 6,553,540 | B1 * | 4/2003 | Schramm et al. ............. 714/790 |
| 6,560,209 | B1 | 5/2003 | Alamouti et al. |
| 6,590,889 | B1 | 7/2003 | Preuss et al. |
| 6,678,310 | B1 | 1/2004 | Andren et al. |
| 2005/0094640 | A1 * | 5/2005 | Howe .......................... 370/395.1 |

FOREIGN PATENT DOCUMENTS

| | | |
|---|---|---|
| JP | 9233047(A) | 9/1997 |
| JP | 10210002(A) | 8/1998 |
| JP | 2000101623 | 4/2000 |
| WO | WO 03005652 | 1/2003 |

OTHER PUBLICATIONS

Webster, Mark and Halford, Steve, "Reuse of 802.11 Preambles with HRb OFDM," IEEE 802.11-00/390, Nov. 1, 2000, pp. 24, XP002217331.

Lambrette U, et al., "OFDM Burst Frequency Synchronization by Single Carrier Training Data," IEEE Communications Letters, IEEE Service Center, Piscataway, U.S., vol. 1, No. 2, Mar. 1, 1997, p. 46, left-hand column, line 21, p. 47, left-hand column, line 6, figure 1, XP000687090.

PCT Notification of Transmittal of the International Search Report or the Declaration, dated Jun. 3, 2003, 5 pages.

Steve Halford, et al., "IEEE P802.11 Wireless LANs, CCK-OFDM Proposed Normative Text," Jul. 10, 2001, XP002242971, retrieved from the Internet<URL: http://grouper.ieee.org/groups/802/11/Documents/D1T401-450.html>, pp. 52-66.

Crochiere R E et al., "Interpolation and Decimiation of Digital Signals—a Tutorial Review," Proceeding of the IEEE, IEEE. New York, US, vol. 69, No. 3, Mar. 1, 1981, pp. 300-331, XP000615159, ISSN: 0018-9219, p. 301, left-hand column, last paragraph-right-hand column, paragraph 5, figures 15, 18, and 20A, section II-B, section III-C.

Adams R: "Asynchronous Conversion Thwarts Incompatibilty in Sampling A/D Systems" EDN Electrical Design News, Cahners Publishing Co. Newton, Mass, US, vol. 39. No. 15, Jul. 21, 1994, pp. 83-88, XP000491530, ISSN: 0012-7515, section "SYnchronous rate-conversion theory".

PCT Notification of Transmittal of the International Search Report or the Declaration, dated Jun. 30, 2003, 5 pages.

PCT Notification of Transmittal of International Preliminary Examination Report, dated Mar. 25, 2003, 7 pages.

Written Opinion, dated Aug. 13, 2002, 4 pages.

DRAFT Supplement to Standard [for] Information Technology—Telecommunications and information exchange between systems—Local and metropolitan area networks—Specific Requirements—Part II: Wireless LAN Medium Access Control (MAC) and Physical LAyer (PHY) specifications: High Speed Physical Layer in the 5 GHz Band, IEEE P802.11a/D7.0 (Supplement to IEEE Std 802.11-1999), Jul. 1999,90 pages.

DRAFT Supplement to Standard [for] Information Technology—Telecommunications and information exchange between systems—Local and metropolitan area networks—Specific Requirements—Part II: Wireless LAN Medium Access Control (MAC) and Physical LAyer (PHY) specifications: Higher speed Physical Layer (PHY) extension in the 2.4 GHz band, IEEE std 802.11b/D7.0 (Draft Supplement to IEEE std 802.11 1999 Edition), Jul. 1999, 94 pages.

"Information Technology—Telecommunications and information exchange between systems—Local and metropolitan area networks,—Specific requirements—Part II: Wireless LAN Medium Access Control (MAC) and Physical Layer (PHY) Specifications", ISO/IEC 8802-11:1999(E) ANSI/IEEE Std 802.11, 1999 Edition, Aug. 1999,531 pages.

Office Action on Japanese Application 2002-502994, mailed Nov. 24, 2010 (with English translation).

Carl Andren et al., "CCK Modulation Delivers 11 Mbps for High Rate," IEEE 802.11 Extension, Wireless Symposium/Portable by Design Conference, 1999, pp. 1-10.

European Patent Office Communication for EP Application 01941716.1, dated May 13, 2003.

International Preliminary Examination Report for PCT/US01/017525, completed Jul. 9, 2002.

International Search Report for PCT/US01/017525, mailed Feb. 27, 2002.

Van Nee et al., "New High-Rate Wireless LAN Standards," IEEE Communications Magazine, vol. 37, No. 12, Dec. 1999, pp. 82-88.

Decision of Refusal on issued on Japanese Application 2002-502994, dispatched Mar. 16, 2011 (with English translation).

* cited by examiner

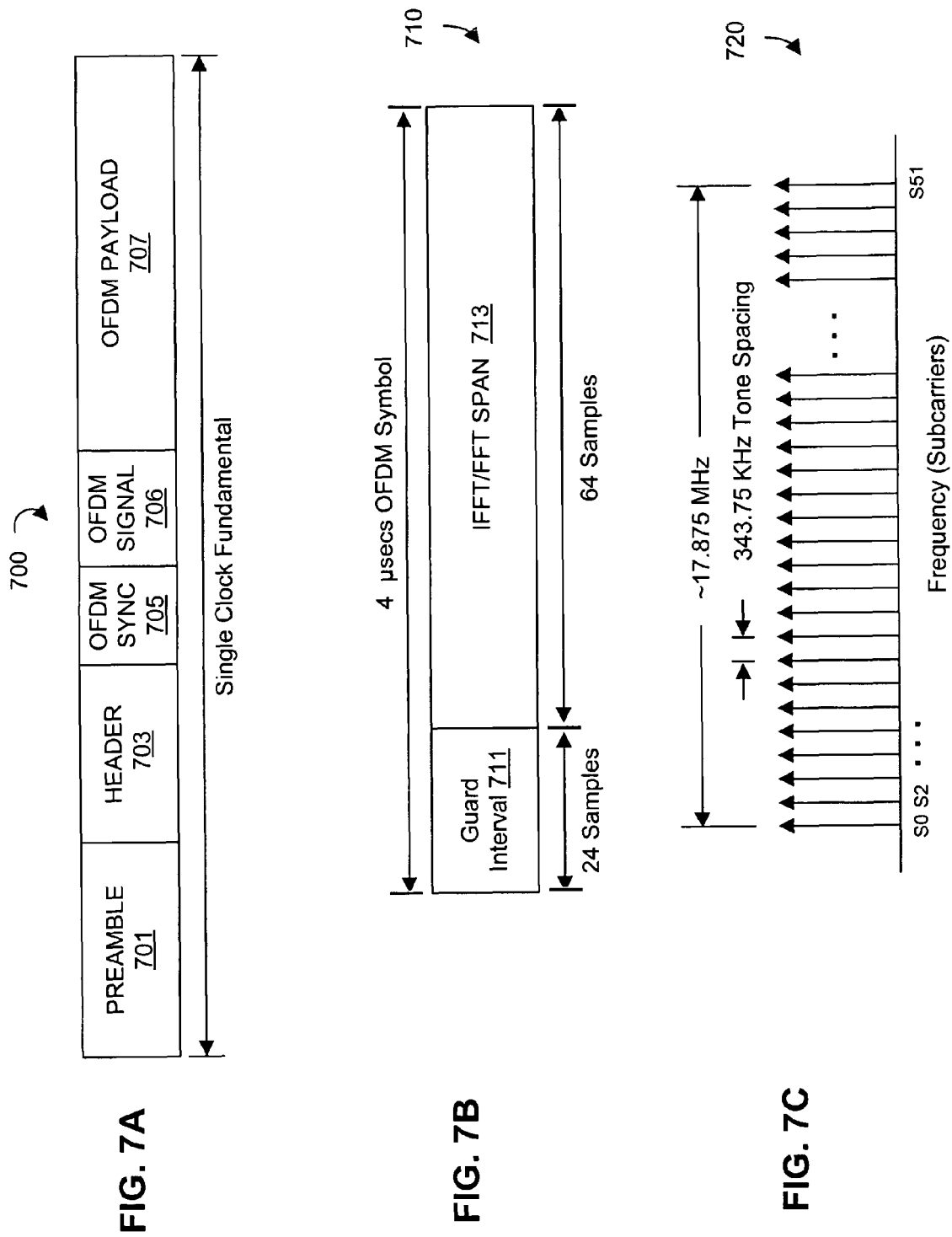

Comparison of Embodiments

| Embod. # | Provided Data Rates (Mbps) | Clock Rate (MHz) | # of Sub-carriers | # of Pilot Tones | # Samples Cyclic Ext. | # Samples FFT | OFDM Symbol Duration (μsecs) | Spectral Width (relative to 802.11a) | ThermalNoise Performance (Eb/No dB) (relative to 802.11a) | Delay Spread Performance (RMS DS) (relative to 802.11a) | Comments |
|---|---|---|---|---|---|---|---|---|---|---|---|
| 1 (500) | 6, 9, 12, 18, 24, 36, 48, 54 | 20 | 52 | 4 | 16 | 64 | 4 | same | same | 802.11a | Clock switch between 20 & 22 MHz |
| 2 (700) | 6, 9, 12, 18, 24, 36, 48, 54 | 22 | 52 | 4 | 24 | 64 | 4 | 10% wider | 0.5 dB worse | 50% better | Clock switch not required; Added samples to cyclic extension |
| 3 (800) | 6.6, 9.9, 13.2, 19.8, 26.4, 39.6, 52.8, 59.4 | 22 | 52 | 4 | 16 | 64 | 3.63637 | 10% wider | same | 10% worse | 802.11a run at 22 MHz; 10% increase in data rates |
| 4 (900, 710, 910) | 5.5, 8.25, 11, 16.5, 22, 33, 44, 49.5 | 22 | 48 | 4 | 24 | 64 | 4 | 0.83% wider | 0.5 dB worse | 50% better | 44 data sub-carriers; Added samples to cyclic extension |
| 5 (900, 710, 920) | 6, 9, 12, 18, 24, 36, 48, 54 | 22 | 48 | 0 | 24 | 64 | 4 | 0.83% wider | 0.5 dB worse | 50% better | 48 data sub-carriers; No pilots; Added samples to cyclic extension |
| 6 (900, 710, 1000, 1010) | 6, 9, 12, 18, 24, 36, 48, 54 | 22 | 48 | 4 | 24 | 64 | 4 | 0.83% wider | 0.9 dB worse | 50% better | Puncture 4 of the 48 data sub-carriers Replace with 4 pilots; Added samples to cyclic extension |
| 7 (900, 810, 910) | 6.05, 9.075, 12.1, 18.15, 24.2, 36.3, 48.4, 54.45 | 22 | 48 | 4 | 16 | 64 | 3.63637 | 0.83% wider | same | 10% worse | 44 data sub-carriers 4 pilots |
| 8 (900, 810, 920) | 6.6, 9.9, 13.2, 19.8, 26.4, 39.6, 52.8, 59.4 | 22 | 48 | 0 | 16 | 64 | 3.63637 | 0.83% wider | same | 10% worse | 48 data sub-carriers. No pilots. |
| 9 (900, 810, 1000, 1010) | 6.6, 9.9, 13.2, 19.8, 26.4, 39.6, 52.8, 59.4 | 22 | 48 | 4 | 16 | 64 | 3.63637 | 0.83% wider | 0.4 dB worse | 10% worse | Puncture 4 of the 48 data sub-carriers Replace with 4 pilots |

FIG. 11

DUAL PACKET CONFIGURATION FOR WIRELESS COMMUNICATIONS

CROSS-REFERENCE TO RELATED APPLICATION

The present invention is a continuation of U.S. application Ser. No. 09/586,571, filed Jun. 2, 2000, which is hereby incorporated by reference in its entirety.

FIELD OF THE INVENTION

The present invention relates to wireless communications, and more particularly to a dual packet configuration for use in wireless local area networks.

DESCRIPTION OF RELATED ART

The Institute of Electrical and Electronics Engineers, Inc. (IEEE) 802.11 standard is a family of standards for wireless local area networks (WLAN) in the unlicensed 2.4 and 5 Gigahertz (GHz) bands. The current 802.11b standard defines various data rates in the 2.4 GHz band, including data rates of 1, 2, 5.5 and 11 Megabits per second (Mbps). The 802.11b standard uses direct sequence spread spectrum (DSSS) with a chip rate of 11 Megahertz (MHz), which is a serial modulation technique. The 802.11a standard defines different and higher data rates of 6, 12, 18, 24, 36 and 54 Mbps in the 5 GHz band. It is noted that systems implemented according to the 802.11a and 802.11b standards are incompatible and will not work together.

A new standard is being proposed, referred to as 802.11 HRb (the "HRb proposal"), which is a high data rate extension of the 802.11b standard at 2.4 GHz. It is noted that, at the present time, the HRb proposal is only a proposal and is not yet a completely defined standard. Several significant technical challenges are presented for the new HRb proposal. It is desired that the HRb devices be able to communicate at data rates higher than the standard 802.11b rates in the 2.4 GHz band. In some configurations, it is desired that the 802.11b and HRb devices be able to coexist in the same WLAN environment or area without significant interference or interruption from each other, regardless of whether the 802.11b and HRb devices are able to communicate with each other. It may further be desired that the HRb and 802.11b devices be able to communicate with each other, such as at any of the standard 802.11b rates.

SUMMARY OF THE INVENTION

A dual packet configuration for wireless communications according to at least one embodiment of the present invention includes a first portion that is modulated according to a serial modulation and a second portion that is modulated according to a parallel modulation. In one embodiment, the serial modulation is direct sequence spread spectrum (DSSS), and the parallel modulation is orthogonal frequency division multiplexing (OFDM). In further embodiments, the first portion may include a preamble and a header, where the preamble may be short or long. The header may further include an OFDM mode bit indicating OFDM mode, and a length field indicating the duration the second portion.

For example, the first portion may be modulated in accordance with the 802.11b standard and readily received and understood by 802.11b compatible devices operating in the 2.4 GHz frequency band. Each 802.11b device receives the preamble and header and determines the duration of the dual packet from the length field, so that the 802.11b devices know how long to back off during transmission of a dual mode packet. In this manner, devices communicating with the dual mode packet configuration will not be disrupted by the 802.11b devices, and may thus coexist within the same communication area as the standard 802.11b devices.

Furthermore, devices utilizing a dual mode packet configuration according to certain embodiments may coexist with 802.11b devices in the 2.4 GHz frequency band while communicating at different or even greater data rates afforded by OFDM, such as data rates similar to the 802.11a standard. Whereas the 802.11b devices are currently limited to 11 Mbps, the dual mode devices may operate at 54 Mbps or higher depending upon the particular configuration. The OFDM mode bit indicates OFDM mode to another target OFDM device. For such OFDM embodiments, the packet configuration may include an OFDM synchronization pattern, an OFDM signal symbol and an OFDM payload. The OFDM signal symbol may further include a data rate section and a data count section for specifying the data rate the number of data bytes in the payload. In this manner, data rates the same as or similar to the 802.11a data rates may be specified between dual mode devices, such as 6, 12, 24, 36 or 54 Mbps.

In at least one embodiment, the first portion of the dual packet configuration may be based on a first clock fundamental whereas the second portion is based on a second clock fundamental. In one embodiment, for example, the first clock fundamental is approximately 22 MHz, whereas the second clock fundamental is approximately 20 MHz. The 22 MHz clock signal is the clock fundamental for the 802.11b standard to enable compatibility with 802.11b devices when operating in the 2.4 GHz band. The 20 MHz clock fundamental is typical for the OFDM modulation technique, so that an increased data rate is achieved within the 2.4 GHz band.

In alternative embodiments, the first and second portions of the dual packet configuration are both based on a single clock fundamental, such as 22 MHz. Various embodiments are contemplated for the single clock fundamental. In one embodiment, each OFDM symbol includes a guard interval with a standard number of samples for OFDM, such as 16 samples according to 802.11a. Alternatively, the guard interval includes an increased number of samples, such as 24 samples.

In yet further embodiments, each OFDM symbol in the packet configuration may include a standard number of frequency subcarriers, such as 52 frequency subcarriers according to 802.11a. Alternatively, a reduced number of frequency subcarriers may be utilized, such as 48 subcarriers. In one embodiment, each frequency subcarrier is a data subcarrier whereas in another embodiment, pilot tones are included. In yet another embodiment, each of the frequency subcarriers are initially data subcarriers and a subset of the data subcarriers is discarded and replaced with a corresponding number of pilot tones for transmission. Upon reception of the packet, the discarded data subcarriers are recreated using received data, such as, for example, application of error correction code (ECC) techniques.

A wireless communication device according to the present invention includes a transmitter and a receiver where each are configured to communicate with a dual packet configuration. The dual packet configuration includes first and second portions, where the first portion is configured according to a serial modulation technique and where the second portion is configured according to a parallel modulation technique. As described previously, the dual packet configuration may utilize DSSS modulation as the serial modulation technique and OFDM as the parallel modulation technique. The wireless communication device may include two separate clock sources if utilizing a dual packet configuration based on first and second clock fundamentals. Alternatively, a single clock source may be utilized if the first and second portions are based on the same clock fundamental. The dual packet configuration utilized by the wireless communication device is according to any of the various embodiments described previously.

In further embodiments, the transmitter and receiver may each be capable of communicating in a super short mode in which only the second portion is utilized. The first, serial portion is not used, so that overall data throughput may be increased. The super short mode is used only for dual mode devices and is generally not compatible with single mode devices. For example, the parallel modulation mode is not compatible with the serial modulation techniques utilized by the 802.11b devices, so that a dual mode device may not coexist or communicate in the same area as active 802.11b devices. For embodiments in which the serial modulation for the first packet portions are 802.11b compatible, the super short mode is advantageous when 802.11b devices are shut off or otherwise not active in the same area, so that the dual packet mode devices may be operated with enhanced data throughputs.

In yet a further embodiment, the transmitter and receiver may each be capable of communicating in a standard mode in which the second portion is modulated according to the serial modulation. For example, this mode may be advantageous when the serial modulation is compatible with other devices, such as 802.11b devices. Thus, the dual mode devices may include the capability to communicate with the 802.11b devices in standard mode at the standard 802.11b rates, while also able to communicate with other dual mode devices at different or higher data rates.

A method of wireless communication using a dual packet configuration according to embodiments of the present invention includes modulating a first portion of each packet according to a serial modulation and modulating a second portion of each packet according to a parallel modulation. The serial modulation may be DSSS and the parallel modulation may be OFDM. The method may further include the various dual packet embodiments described previously. The method may further comprise switching to a super short mode of operation in which only the second portion modulated according to the parallel modulation is utilized for communications. The super short mode enables enhanced communications with other dual mode devices. The method may further include switching to a standard mode of operation in which the second portion is modulated according to the serial modulation of the first portion. For 802.11b compatible embodiments, the standard mode enables direct communication with 802.11b devices and enhanced communication with other dual mode devices.

A dual packet configuration for wireless communications in accordance with embodiments of the present invention provides a suitable solution to the 802.11 HRb proposal. Dual mode devices may be configured to communicate with or otherwise coexist within the same area as standard 802.11b devices, while communicating with each other at different or higher data rates.

BRIEF DESCRIPTION OF THE DRAWINGS

A better understanding of the present invention can be obtained when the following detailed description of the preferred embodiment is considered in conjunction with the following drawings, in which:

FIGS. 7A-7C are graph diagrams illustrating a packet configuration utilizing a single clock fundamental.

FIG. 11 is a table diagram illustrating comparisons of the various OFDM embodiments illustrating variations in data rates, OFDM symbol duration, spectral width, thermal noise and delay spread spectrum as a result of variations in the clock rates, number of subcarriers, number of pilot tones, and the number of samples in the guard interval.

DETAILED DESCRIPTION OF EMBODIMENT(S) OF THE INVENTION

Figure 1:
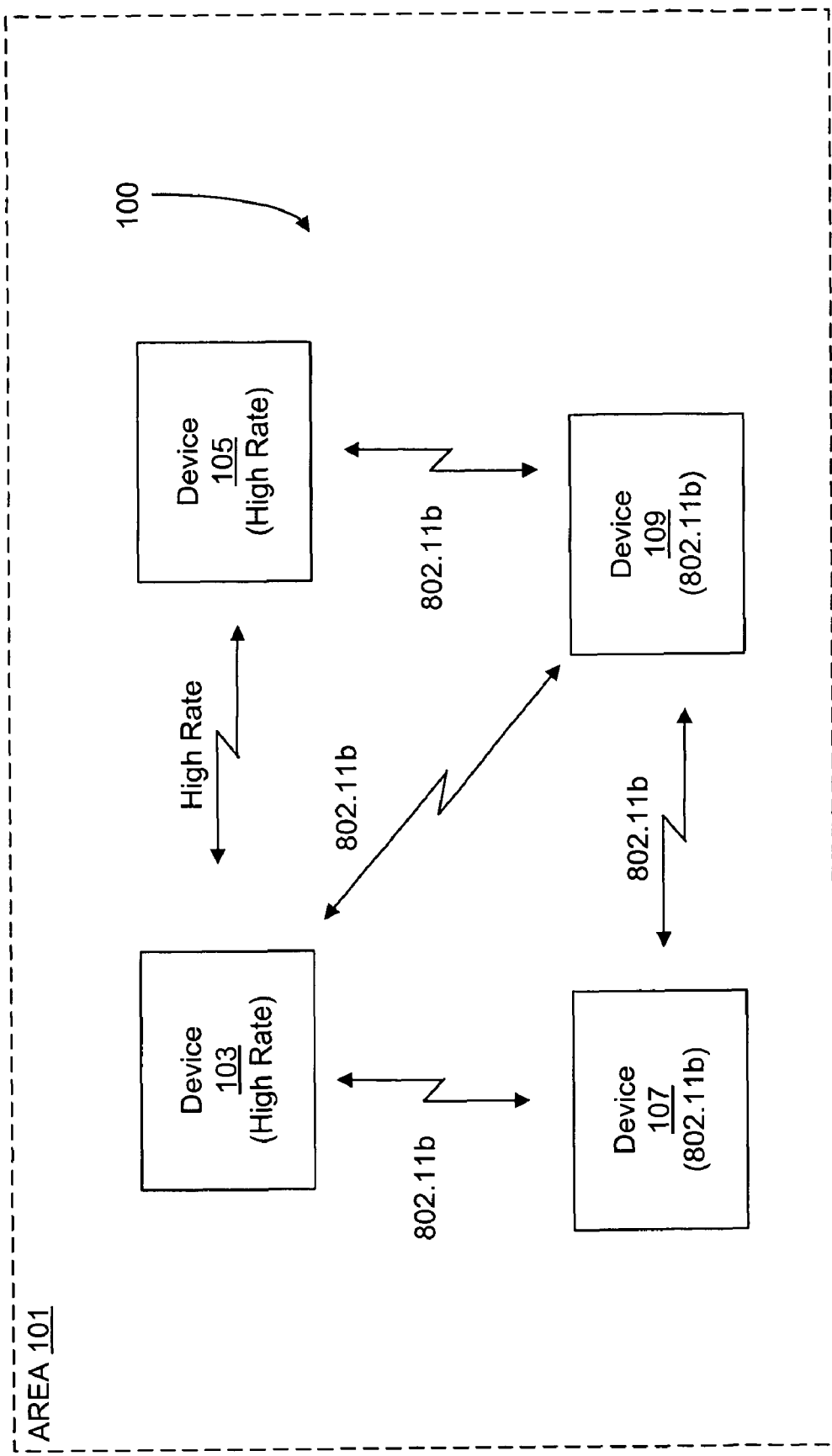
FIG. 1 is a block diagram of a WLAN system including four devices operating within the same room or area, where two of the devices are implemented according to the 802.11b standard and the other two are implemented according to the HRb proposal.

FIG. 1 is a block diagram of a wireless local area network (WLAN) system 100 operating within a particular room or area 101, including four WLAN devices 103, 105, 107 and 109 (103-109) are located within the area 101. The devices 103 and 105 are implemented according to at least one of several embodiments of the present invention with the HRb proposal in mind, whereas the devices 107 and 109 are implemented according to the 802.11b standard. All of the devices 103-109 operate in the 2.4 GHz band. The devices 103-109 may be any type of wireless communication device, such as any type of computer (desktop, portable, laptop, etc.), any type of compatible telecommunication device, any type of personal digital assistant (PDA), or any other type of network device, such as printers, fax machines, scanners, hubs, switches, routers, etc. It is noted that the present invention is not limited to the HRb proposal, the 802.11b standard, the 802.11a standard or the 2.4 GHz frequency band, although these standards and frequencies may be utilized in certain embodiments.

The devices 107 and 109 communicate with each other at any of the standard 802.11b rates, including 1, 2, 5.5 and 11 Mbps. The devices 103 and 105 are dual mode devices that communicate with each other at different or higher data rates using a dual packet configuration according to any one of several embodiments described below, such as the standard 802.11a data rates of 6, 9, 12, 18, 24, 36, 48 or 54 Mbps. Alternative data rate groups are considered herein, such as a first group of 6.6, 9.9, 13.2, 19.8, 26.4, 39.6, 52.8 or 59.4 Mbps, or a second group of 5.5, 8.25, 11, 16.5, 22, 33, 44 or 49.5 Mbps, or a third group of 6.05, 9.075, 12.1, 18.15, 24.2, 36.3, 48.4 or 54.45 Mbps. The second group is advantageous as including two of the 802.11b standard data rates, namely 5.5 and 11 Mbps.

In one or more first embodiments, the dual mode devices 103-109 may operate or coexist in the same area 101 without significant interference from each other, where the devices 103, 105 communicate with each other at different or higher data rates than the 802.11b devices 107, 109. In the first embodiments, the devices 103, 105 may communicate with each other while the devices 107, 109 may communicate with each other, but the devices 103, 105 do not communicate with the devices 107, 109. In one or more second embodiments, at least one of the dual mode devices 103, 105 is configured with a standard mode to be able to communicate with either of the devices 107, 109 at any one or more of the standard 802.11b data rates. In at least one third embodiment, the dual mode devices 103, 105 are configured with a super short mode and communicate at different or higher data rates and are incompatible with the devices 107 and 109, so that the devices 103-109 are not able to coexist within the same area 101. The dual mode devices 103, 105 may be implemented to operate in the 2.4 GHz band, although other frequency bands are contemplated.

Figure 2:
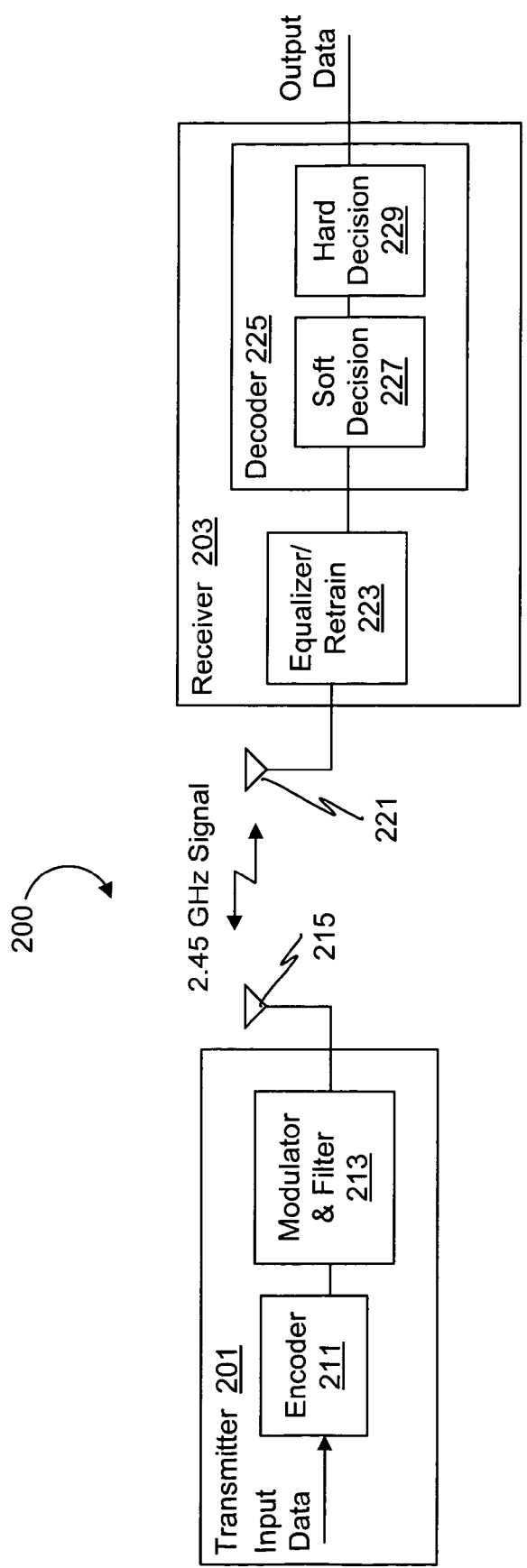
FIG. 2 is a simplified block diagram of an exemplary transceiver according to one embodiment of the present invention that may be utilized in either or both of the HRb devices of FIG. 1.

In the first or second embodiments, it is desired that the devices 103 and 105 be able to communicate with each other without interruption or interference from either of the devices 107 and 109. This presents a significant technical challenge since the devices 103, 105 operate at different data rates when communicating with each other. The present invention solves this problem by enabling the devices 103 and 105 to be implemented to be able to communicate with each other at different or at higher data rates while residing in a same area 101 as the 802.11b devices 107, 109. Further, in the second embodiments the devices 103, 105 may also communicate with either of the devices 107, 109 at the 802.11b data rates FIG. 2 is a simplified block diagram of an exemplary dual mode transceiver 200 according to one embodiment of the present invention that may be utilized in either or both of the devices 103, 105. The transceiver 200 includes an exemplary dual mode transmitter 201 and exemplary dual mode receiver 203. Within the transmitter 201, input data is provided to an encoder 211 at a particular rate of transmission. The data from the encoder 211 is provided to a modulator and filter 213, which modulates the encoded data onto a transmission signal asserted via a corresponding antennae 215. The transmitted signal is received by an antennae 221 of the receiver 203, which provides the received signal to an equalizer and retrain system 223. The equalizer/retrain system 223 demodulates the received signal and provides a demodulated signal to a decoder 225, which provides the output data. Within the decoder 225, a soft decision block 227 provides soft decision signals to a hard decision block 229, which formulates the final output data.

Figure 3:
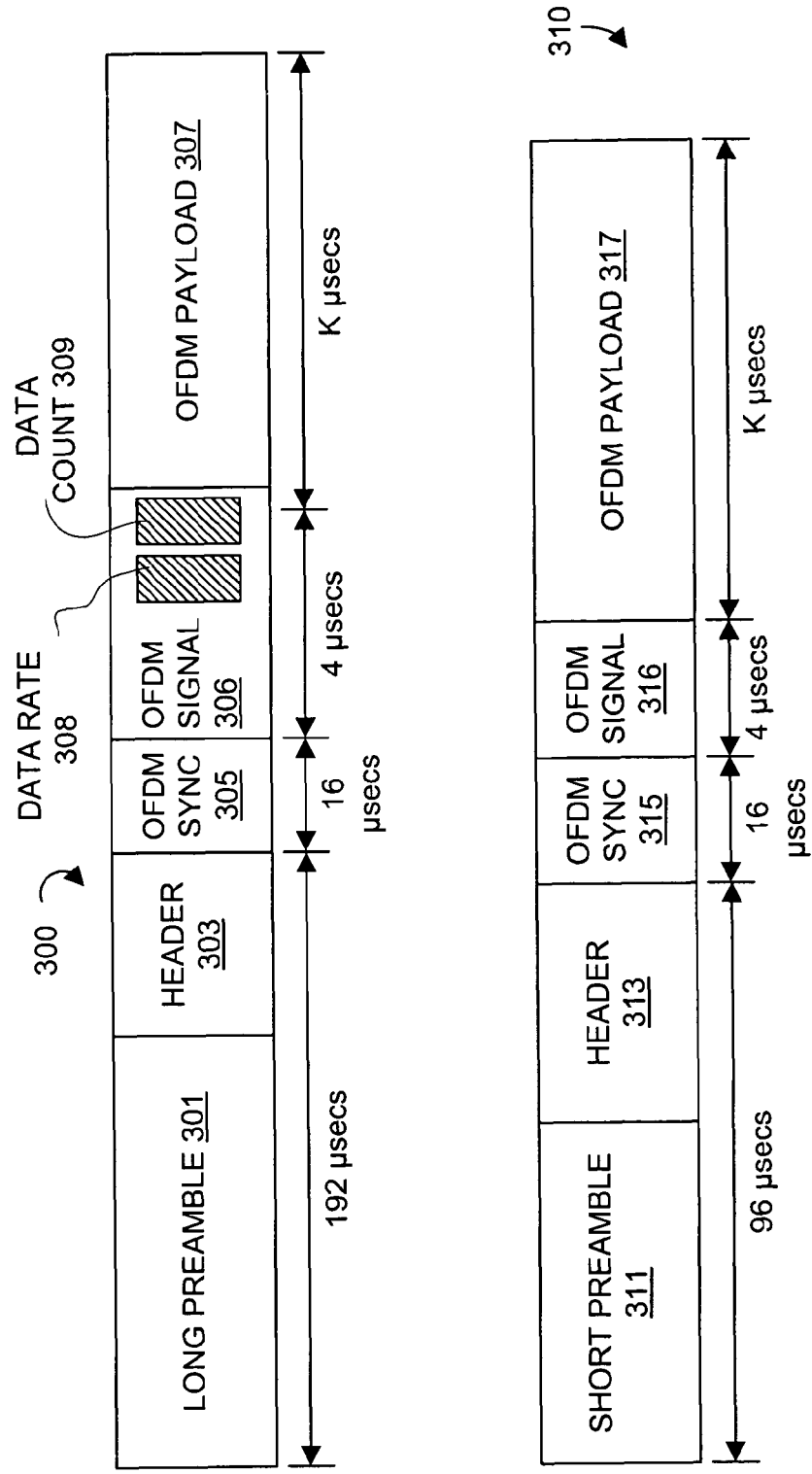
FIG. 3A is a graph diagram of a packet configuration utilizing a long preamble.
FIG. 3B is a graph diagram of an alternative packet configuration utilizing a short preamble.

FIG. 3A is a graph diagram of a dual packet configuration 300 according one embodiment of the present invention utilizing a long preamble. The packet configuration 300 includes a long preamble 301, which may be implemented according to the 802.11b standard having 144 bits. Also according to the 802.11b standard, the long preamble is transmitted at a data rate of 1 Mbps. The long preamble 301 is followed by a header 303, which again may be implemented according to the 802.11b standard having 48 bits transmitted at a data rate of 1 Mbps. In accordance with the 802.11b standard, the preamble 301 and header 303 are transmitted in approximately 192 microseconds (μsecs). Instead of a normal 802.11b packet however, the packet configuration 300 includes an orthogonal frequency division multiplexing (OFDM) synchronization (sync) pattern 305, followed by an OFDM signal symbol 306, followed by an OFDM payload 307. OFDM is a parallel modulation technique utilizing a plurality of subcarrier frequencies transmitted in parallel for each of a plurality of OFDM symbols, as further described below.

The OFDM sync pattern 305 may be implemented according to the 802.11a standard and is transmitted in approximately 16 μsecs. For example, the OFDM sync pattern 305 may be implemented according to the OFDM sync pattern specified in the 802.11a standard, which is a special pattern that enables a receiver circuit to determine precisely when the first data bit of the payload will arrive. The OFDM signal symbol 306 may also be implemented according to the 802.11a standard and is transmitted in approximately 4 μsecs. As shown, the OFDM signal symbol 306 includes a data rate section 308 and a data count section 309. The data rate section 308 is a bit field specifying the data rate, such as the standard 802.11a rates, and the data count section 309 is a bit field indicative of the number of data bytes in the payload 307. In one embodiment, the OFDM payload 307 is comprised of OFDM symbols at any one of the 802.11a standard data rates of 6, 9, 12, 18, 24, 36, 48, or 54 Mbps, which are PHY sublayer Service Data Units (PSDU) selectable. The OFDM payload 307 is transmitted in "K" μsecs, where K is not necessarily directly related to the number of OFDM symbols in the payload portion.

FIG. 3B is a graph diagram of an alternative packet configuration 310 incorporating a short preamble 311. In an embodiment in accordance with 802.11b, the packet configuration 310 includes a 72-bit preamble 311 transmitted at 1 Mbps, followed by a header 313 transmitted at 2 Mbps, followed by an OFDM sync pattern 315 similar to the OFDM sync pattern 305, followed by an OFDM signal symbol 316 similar to the OFDM signal symbol 306, which is followed by an OFDM payload 317 comprising OFDM symbols at any of the standard 802.11a data rates. The data rates are PSDU selectable in a similar manner as the OFDM payload 307. According to 802.11b, the short preamble 311 and the header 313 are transmitted in approximately 96 μsecs. Again according to 802.11a, the OFDM sync pattern 315 is transmitted in 16 μsecs, the OFDM signal symbol 316 is transmitted in 4 μsecs and the OFDM payload 317 is transmitted in K μsecs.

The short preamble 311 is utilized to reduce overhead and allow more data to be transmitted in the same amount of time as compared to the long preamble 301. A system utilizing the short preamble, however, may need a higher signal to noise (SNR) ratio to achieve accurate reception of data. The OFDM signal symbol 316 may also include a data count and data rate similar to the OFDM signal symbol 306 to specify the number of information bytes and OFDM data rate of the payload portion.

Figures 4, 5:
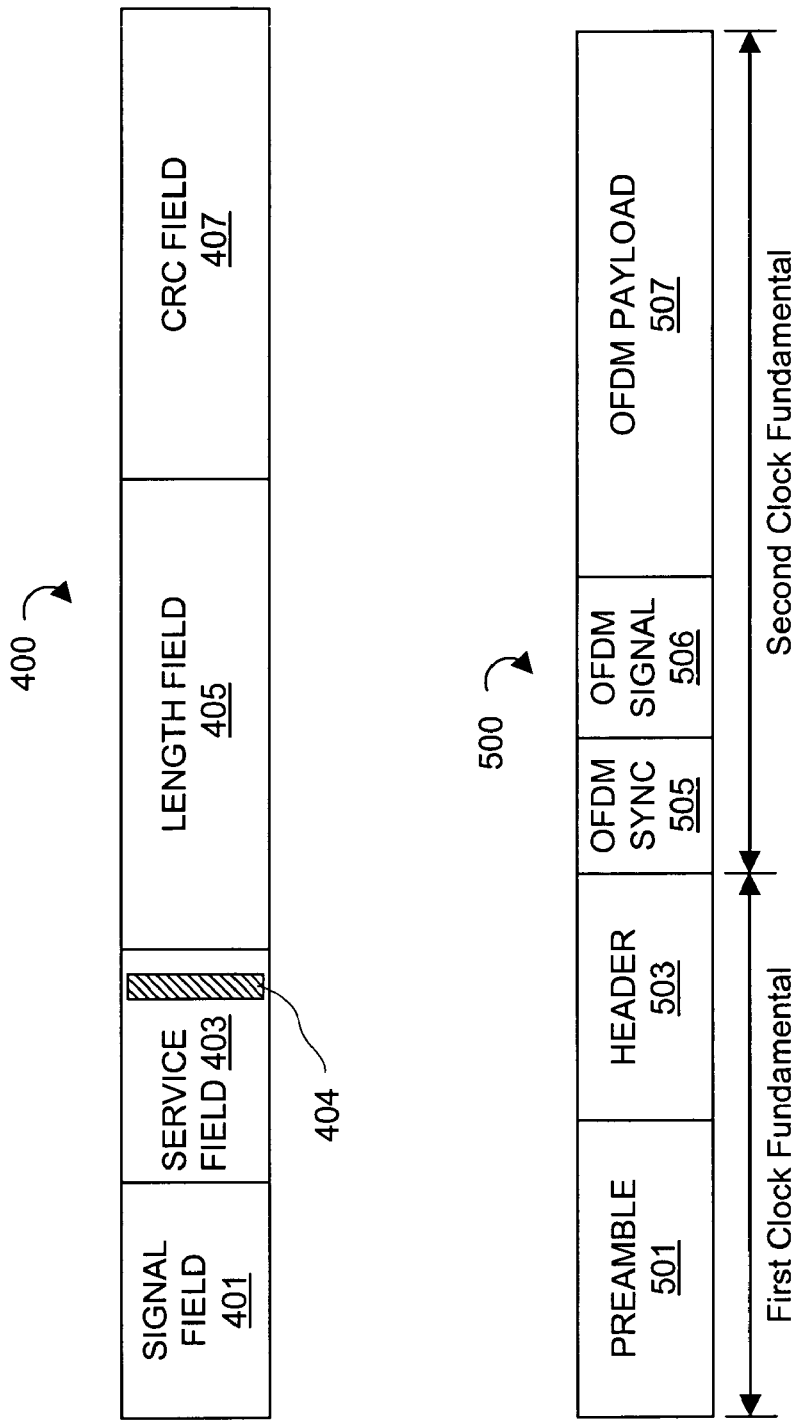
FIG. 4 is a graph diagram of an exemplary header, which may be used as the header for the packet configurations of FIG. 3A or 3B.
FIG. 5 is a graph diagram of a packet configuration implemented according to a dual clock fundamental embodiment of the present invention.

FIG. 4 is a graph diagram of an exemplary header 400, which may be used as the header 303 for the packet configuration 300 or the header 313 for the packet configuration 310. The header 400 may be implemented in a similar manner as the 802.11b standard header including an 8-bit signal field 401, an 8-bit service field 403, a 16-bit length field 405, and a 16-bit cyclical redundancy check (CRC) field 407. The header 400 is modified, however, to include OFDM mode bit 404 within the service field 403 to denote the OFDM mode of operation. The signal field 401 is normally used to accommodate rates of up to 25.5 Mbps according to 802.11b. However, if the OFDM mode is indicated by the OFDM mode bit 404, then the signal field 401 is interpreted differently as any data rate supported by the transmitting device, such as either of the devices 103, 105. In some embodiments, the 802.11a standard data rates are used, including 6, 9, 12, 18, 24, 36, 48, or 54 Mbps. Alternative data rates are used in alternative embodiments, as further described below. The length field 405 is utilized in a similar manner as 802.11b and indicates the duration or number of μsecs for transmission of the OFDM sync pattern, signal symbol and payload, such as either of the OFDM sync patterns 305, 315 (16 μsecs), signal symbols 306, 316 (4 μsecs) and data payloads 307, 317 (K μsecs). For example, the length field 405 includes a bit pattern representing the number K+20 μsecs. If actual packet length is equal to a fractional number of μsecs, then the length field 405 specifies the next highest integer. For example, an actual packet length of 237.4 μsecs would use 238 in the length field. The CRC field 407 is utilized in a similar manner as the standard header for 802.11b.

In general, the dual packet configurations 300, 310 include a first portion comprising the preamble and header and a second portion comprising the OFDM sync, signal symbol and payload. The first portion is modulated according to serial modulation, such as direct sequence spread spectrum (DSSS) according to 802.11b, and the second portion is modulated according to parallel modulation, such as OFDM. It is appreciated that either dual packet configuration 300 or 310 utilized by either of the devices 103, 105, when configured according to the serial modulation of 802.11b, are readily received and understood by either of the devices 107, 109. In particular, the long preamble 301 and header 303 of the packet configuration 300 or the short preamble 311 and the header 313 of the packet configuration 310, are implemented in a similar manner and transmitted at the same data rates as those of standard 802.11b devices. Regardless of whether the 802.11b devices 107, 109 are able to detect or otherwise interpret the OFDM mode bit 404 indicating OFDM mode, the length field 405 is interpreted in the same manner as a duration of the second portion of the packet, so that both of the devices 107, 109 are informed of the length of the OFDM sync, signal symbol and payload of a packet transmitted by either of the devices 103, 105. In this manner, any 802.11b device in the same area, such as the area 101, as a dual mode device utilizing the dual packet configurations 300 or 310 is sufficiently informed of the amount of time to back off during transmission of a dual mode packet regardless of its data rate.

The devices 103, 105 are configured to detect the OFDM mode bit 404 in the service field 403 and to correspondingly interpret the signal field 401 to therefore identify the modulation technique and the data rate of transmission to enable communications between the devices 103, 105. When the OFDM mode is indicated, the devices 103, 105 are further configured to detect the OFDM sync pattern, read the OFDM signal symbol, and retrieve the data in the OFDM payload. In this manner, when the devices 103, 105 are utilizing the dual packet configurations 300 or 310, they may communicate at different or higher data rates while coexisting within the same area 101 as any 802.11b device, such as the devices 107, 109. The devices 103, 105 may further be configured with a standard mode to communicate with the devices 107, 109 at the standard 802.11b data rates if desired. For example, the devices 103, 105 may include the necessary 802.11b communication circuitry. It is noted that the devices 107, 109 are unable to understand or receive and demodulate the OFDM sync, signal symbol and payload portions of the packet configurations 300 or 310 in OFDM mode. The devices 103, 105 may further be configured to switch to a super short mode, described further below, in which only the second, parallel modulation portion of the packet configurations are utilized. In the super short mode, the devices 103, 105 may not coexist with active devices 107, 109, and thus may be used when the devices 107, 109 are switched off or otherwise removed from the area 101.

FIG. 5 is a graph diagram of a dual packet configuration 500 implemented according to a dual clock fundamental embodiment of the present invention. The packet configuration 500 is shown corresponding to either of the packet configurations 300 or 310, including a preamble 501, followed by a header 503, followed by an OFDM sync pattern 505, followed by an OFDM signal symbol 506, followed by an OFDM payload 507. The preamble 501 is according to either of the long or short preambles 301, 311. The header 503 is implemented according to either the headers 303 or 313 depending upon the rate of transmission (1 or 2 Mbps). The OFDM sync pattern 505 is implemented according to either of the OFDM sync patterns 305 or 315. The OFDM signal symbol 506 is implemented according to either of the OFDM signal symbols 306 or 316, and may include data rate and data count fields in a similar manner as described for the packet configuration 300. The OFDM payload 507 is implemented according to either of the OFDM payloads 307, 317.

For the packet configuration 500, the preamble 501 and the header 503 comprise a first portion that is transmitted utilizing a first clock fundamental with serial modulation, whereas the OFDM sync pattern 505, the OFDM signal symbol 506 and the OFDM payload 507 comprise a second portion that is transmitted utilizing a second clock fundamental with parallel modulation. For 802.11b, the first clock fundamental for the preamble 501 and the header 503 is 22 Megahertz (MHz). The second clock fundamental for the OFDM sync pattern 505 and the payload 507 may be according to 802.11a, such as 20 MHz. In this manner, the packet configuration 500 is transmitted using two separate clock fundamentals requiring a switch in sampling rate between the header 503 and the OFDM sync pattern 505. Several embodiments are considered for providing a rate change solution between the 22 and 20 MHz clock fundamentals.

Figure 6A:
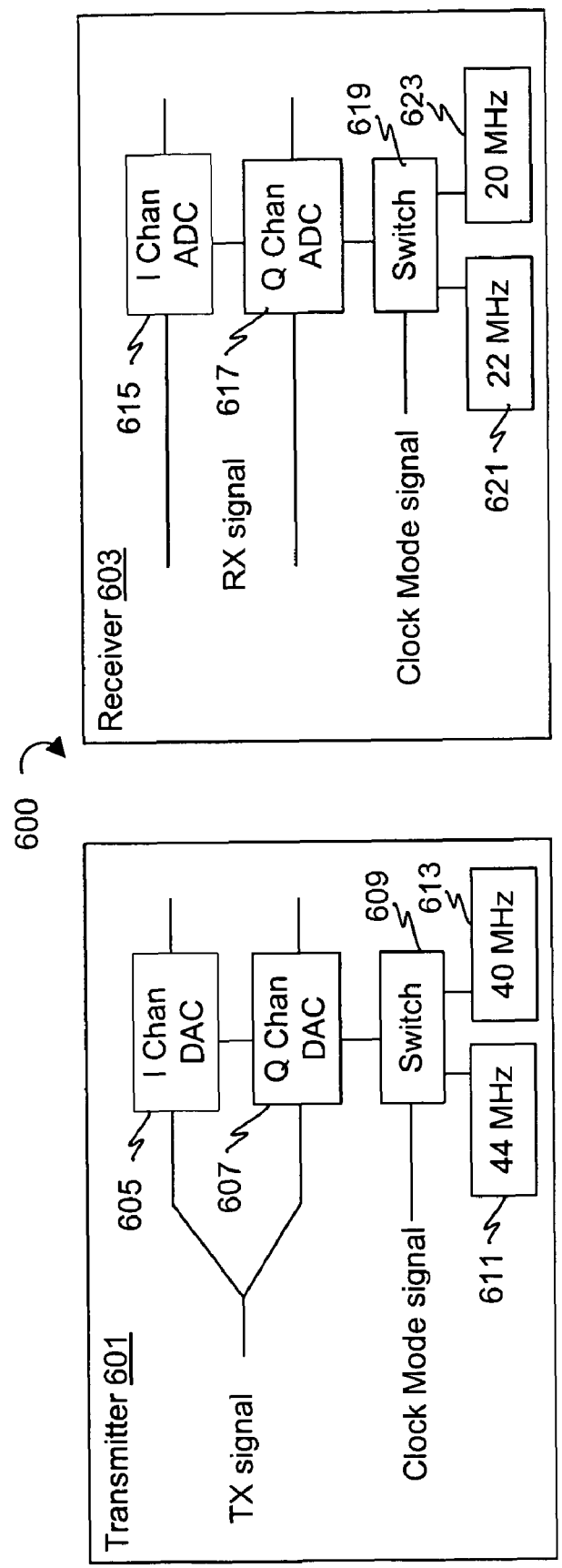
FIG. 6A is a simplified block diagram of a transceiver configured to utilize the packet configuration of FIG. 5.

FIG. 6A is a simplified block diagram of a dual mode transceiver 600 configured to utilize the dual packet configuration 500. The transceiver 600 includes a dual mode transmitter 601 and a dual mode receiver 603. Within the transmitter 601, the transmit signal is divided into first and second quadrature portions which are provided to an I channel digital-to-analog converter (DAC) 605 and to a Q channel DAC 607. The I and Q channel DACs 605, 607 receive a clock signal from a switch 609, which receives and switched between a 40 MHz clock signal from a clock source 613 and a 44 MHz clock signal from a clock source 611. The 40 MHz clock signal is based on the 20 MHz clock fundamental whereas the 44 MHz clock signal is based on the 22 MHz clock fundamental. The 22 MHz receive clock and the 44 MHz transmit clock are harmonically related to the 11 MHz 802.11b DSSS chip rate. The switch 609 is controlled by a clock mode signal to select either the 44 MHz clock signal or the 40 MHz clock signal. In this manner, the preamble 501 and the header 503 are transmitted while the clock mode signal selects the 44 MHz clock 611 whereas the OFDM sync pattern 505, signal symbol 506 and payload 507 are transmitted utilizing the 40 MHz clock signal.

For the receiver 603, an I channel analog-to-digital (ADC) 615 and a Q channel ADC 617 receive the respective quadrature portions of the received signal. A switch 619 receives the clock mode signal and controls or otherwise provides either a 22 MHz clock signal from a clock source 621 or a 20 MHz clock signal from a clock source 623. The receiver 603 is configured to receive the preamble 501 and header 503 with the 22 MHz clock signal selected, and then to receive the OFDM sync pattern 505, signal symbol 506 and payload with the 20 MHz clock signal selected. The conversion between the two clock signals may be handled in various ways by the base band processor (BBP), such as an on-chip phase lock loop (PLL) or two external clock inputs to the BBP. The transmitter 601 and the receiver 603 must each include two separate clock sources for switching between the different clock fundamental signals. Further, the DACs 605, 607 and the ADCs 615, 617 must be configured to operate at either clock fundamental. In this manner, the transceiver 600 is a somewhat complicated solution requiring additional circuitry.

Figure 6B:
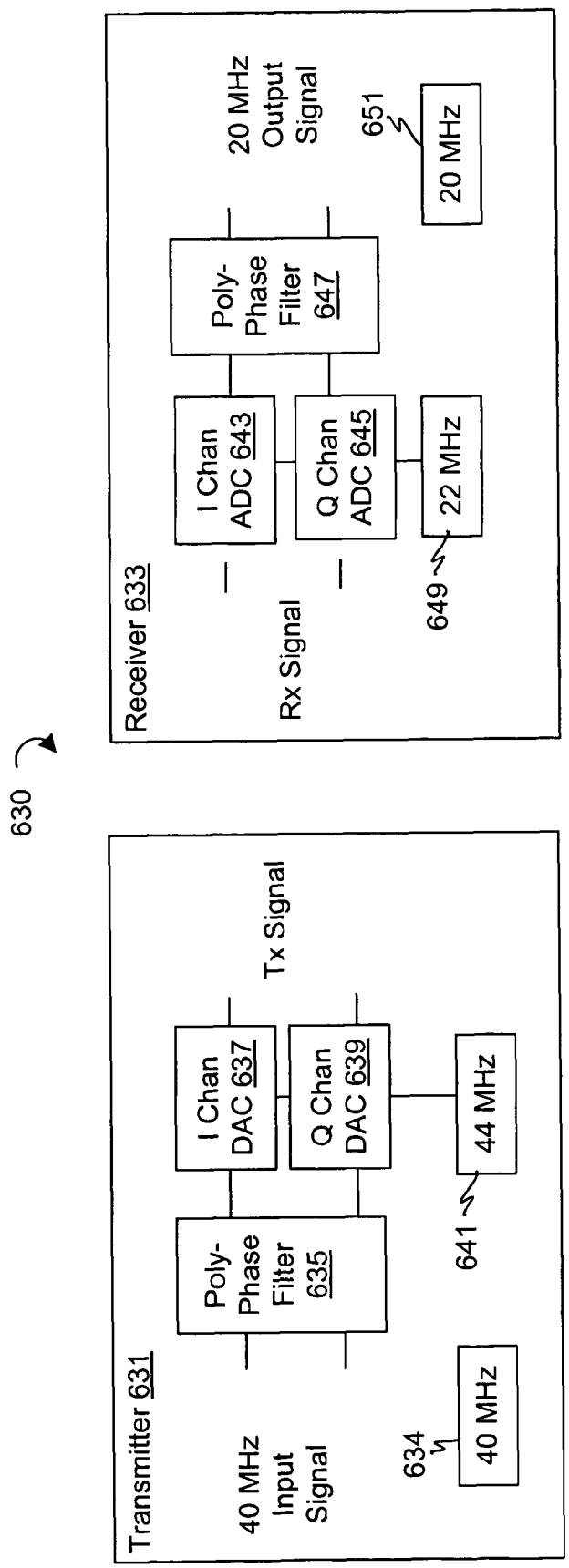
FIG. 6B is a simplified block diagram of an alternative transceiver configured to utilize the packet configuration of FIG. 5.

FIG. 6B is a simplified block diagram of an alternative transceiver 630. The transceiver 630 includes a transmitter 631 and a corresponding receiver 633. Here a polyphase filter is used to provide the clock change during the OFDM portion of the signal. During the 802.11b portion of the signal, the polyphase filter is not needed, since a clock of 22 or 44 MHz is already provided. During the OFDM portion of the signal, the polyphase filter is activated to rate shift the signal samples between the two clock domains. The transmitter 631 operates based on a 40 MHz input signal, utilizing a 40 MHz clock source 634, provided to a polyphase filter 635. The outputs of the polyphase filter 635 are provided to an I channel DAC 637 and a Q channel DAC 639, which are operated at a 44 MHz clock signal provided from a clock source 641. For the receiver 633, the receive signals are provided to an I channel ADC 643 and a Q channel ADC 645. The outputs of the ADC 643, 645 are provided to a polyphase filter 647, which asserts a 20 MHz output signal utilizing a 20 MHz clock source 651. A 22 MHz clock signal from a clock source 649 provides the clocking signal for the ADC 643, 645. It is noted that the transmitter 631 and the receiver 633 both utilize two separate clock sources. In particular, the transmitter 631 requires the 40 MHz clock source 634 and the 44 MHz clock source 641, whereas the receiver 633 utilizes the 22 MHz clock source 649 and the 20 MHz clock source 651. Thus, additional clocking circuitry is needed and the polyphase filter 635, 647 are rate change filters that are relatively complicated.

FIGS. 7A-7C are graph diagrams illustrating a dual packet configuration 700 implemented according to an alternative embodiment of the present invention utilizing a single clock fundamental and with increased samples in the guard interval. As shown in FIG. 7A, the packet configuration 700 is similar to the packet configuration 500 and includes a first, serially modulated portion with a preamble 701 and a header 703, and a second parallel modulation portion including an OFDM sync pattern 705, an OFDM signal symbol 706 and a payload portion 707. The OFDM signal symbol 706 may include data rate and data count fields in a similar manner as described for the packet configuration 300. The preamble 701 is similar to the preamble 501 and may be implemented according to either of the preambles 301, 311 depending upon whether a long or short preamble is desired. Also, the header 703 is implemented according either the header 303 or 313 depending upon the rate of transmission such as either 1 or 2 Mbps. The packet configuration 700 is different, however, in that the entire packet is transmitted utilizing a single clock fundamental. In one embodiment, the clock fundamental is 22 MHz according to 802.11b. Since the OFDM sync pattern 705, signal symbol 706 and payload 707 are implemented utilizing OFDM, they are slightly modified as compared to the 802.11a standard.

FIG. 7B is a graph diagram of an exemplary OFDM symbol 710 that utilizes a 22 MHz sampling fundamental according to one embodiment of the dual packet configuration 700. The OFDM symbol 710 is similar to a standard 802.11a OFDM symbol and includes a guard interval 711 followed by an Inverse Fast Fourier Transform (IFFT)/FFT span 713. The OFDM symbol 710 deviates from the 802.11a standard in that the cyclic extension or guard interval 711 is comprised of 24 samples rather than the standard 16 samples. The IFFT/FFT span 713 includes 64 samples similar to the 802.11a standard. It is noted however that the OFDM symbol 710, while transmitted in 4 μsecs similar to the 802.11a standard, is based on a 22 MHz sampling fundamental unlike the 802.11a standard based on 20 MHz.

FIG. 7C is a graph diagram illustrating the tone spacing of 52 subcarriers 720 of the OFDM symbol 710, each subcarrier denoted Sn, where n varies from 0 to 51. The subcarriers S0-S51 include data subcarriers and pilot tones. The frequency span 720 for each OFDM symbol 710 is approximately 17 to 18 MHz (~17.875 MHz) with a tone spacing between each of the 52 subcarriers of approximately 343 to 344 kilohertz (kHz) (343.75 kHz). The 52 subcarriers according to the 802.11a standard has a frequency span of approximately 16.25 MHz with a tone spacing of approximately 312.5 kHz, with four (4) pilot tones. The OFDM symbol 710 therefore exhibits slightly more loss as compared to a standard 802.11a symbol. A dual mode transceiver implementation configured to send and receive the packet configuration 700 utilizing the OFDM symbol 710 does not require two separate clock sources or otherwise utilize two separate clock fundamentals. Instead, only a single clock fundamental, such as 22 MHz, is necessary. However, a slight loss is experienced with an implementation for the packet configuration 700, such as approximately 0.5 dB. Furthermore, more severe filtering is required for the packet configuration 700 at the single clock fundamental as compared to a standard 802.11a configuration since the overall spectrum is approximately 10% broader. The spectral mask for the packet configuration 700 is also slightly harder to meet as compared to the standard 802.11a.

Figure 8A:
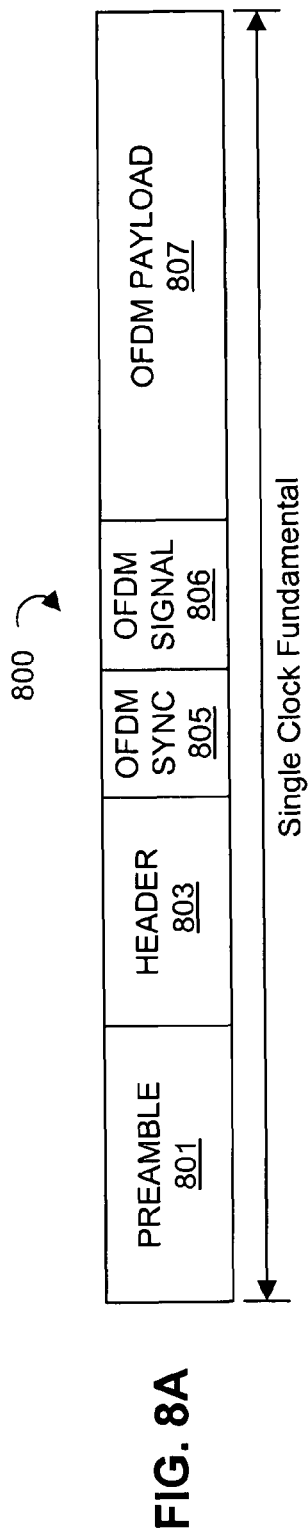
FIGS. 8A-8C are graph diagrams illustrating another exemplary packet configuration utilizing a single clock fundamental and a standard number of samples in the guard interval.
Figure 8B:
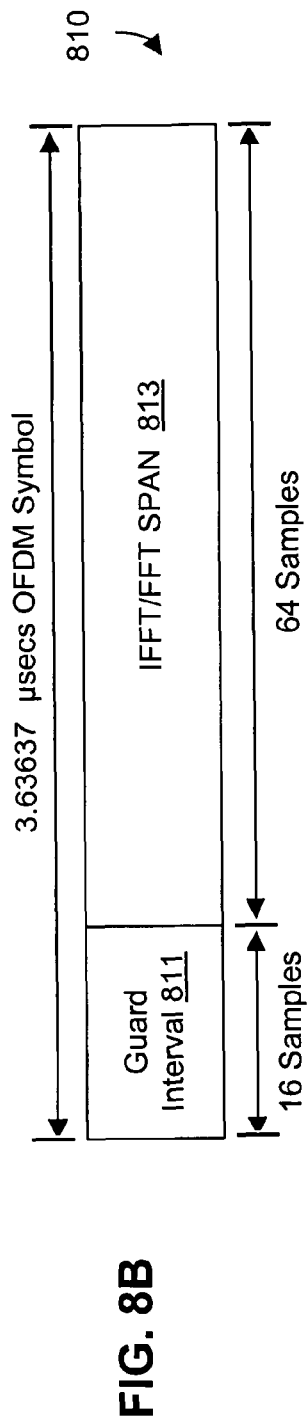
Figure 8C:
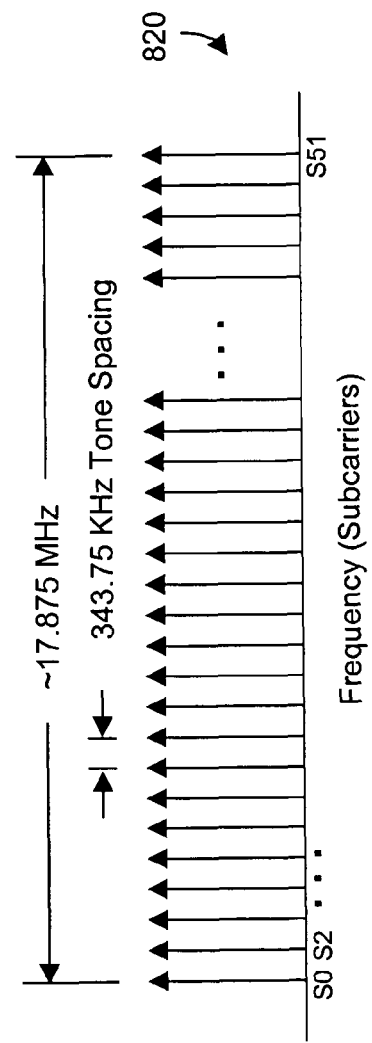

FIGS. 8A-8C are graph diagrams illustrating another exemplary dual packet configuration 800 implemented according to an alternative embodiment utilizing a single clock fundamental and a standard number of samples in the guard interval. As shown in FIG. 8A, the packet configuration 800 is similar to the packet configuration 700, including a preamble 801, a header 803, an OFDM sync pattern 805, an OFDM signal symbol 806 and a payload portion 807, and is based on a single clock fundamental, such as 22 MHz, except that the 802.11a OFDM symbol waveform is effectively unmodified. Again, the OFDM signal symbol 806 may include data rate and data count fields in a similar manner as described for the packet configuration 300. As shown in FIG. 8B, for example, the guard interval 811 utilizes the 802.11a standard 16 samples rather than the 24 samples of the guard interval 711. The OFDM symbol 810 is therefore transmitted in just over 3.5 μsecs or approximately 3.63637 μsecs rather than 4 μsecs.

The dual packet configuration 800 includes 52 subcarriers 820 for each of the OFDM symbols 810, as shown in FIG. 8C. The data rates for the packet configuration 800 is slightly modified as compared to the data rate of the packet configuration 700. In particular, the data rates for the packet configuration 800 ranges from 6.6, 9.9, 13.2, 19.8, 26.4, 39.6, 52.8, or 59.4 Mbps, which are slightly greater than the data rates for the packet configuration 700. The spectral width for the packet configuration 800 is approximately 10% wider as compared to 802.11a. One advantage is that the packet configuration 800 is based on the same clock fundamental so there is no need for clock switching or two different clock generators or circuitry. Another advantage of the packet configuration 800 over the packet configuration 700 is that there is about the same loss as compared to 802.11a and not the greater loss of 0.5 dB as experienced for the packet configuration 700. Further, the Root Mean Square Delay Spread Performance (RMS DS) for the packet configuration 800 is approximately 10% worse as compared to 802.11a.

Figure 9A:
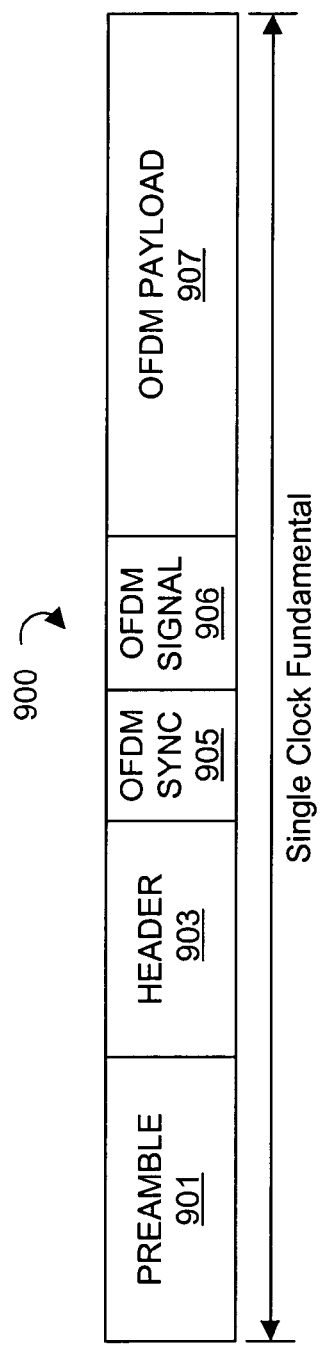
FIG. 9A is a graph diagram of packet configuration utilizing 48 subcarriers.

FIG. 9A is a graph diagram of dual packet configuration 900 similar to the dual packet configurations 700 and 800, including a first portion comprising a preamble 901 and a header 903, and a second portion including an OFDM sync pattern 905, an OFDM signal symbol 906 and a payload portion 907. The dual packet configuration 900 operates with the same or a single clock fundamental, such as 22 MHz, except that the OFDM waveform is modified to include a reduced number of frequency subcarriers, such as only 48 subcarriers rather than 52 subcarriers. Again, the OFDM signal symbol 906 may include data rate and data count fields in a similar manner as described for the packet configuration 300. The 802.11a standard specifies a total number of subcarriers as 52 which includes 48 data subcarriers and 4 pilot tones. Utilizing 48 subcarriers rather than 52 generates a narrower spectrum although the spectral width is essentially the same as the 802.11a standard. The packet configuration 900, however, may be modified in several ways to generate multiple embodiments of the present invention as further described below.

Figure 9B:
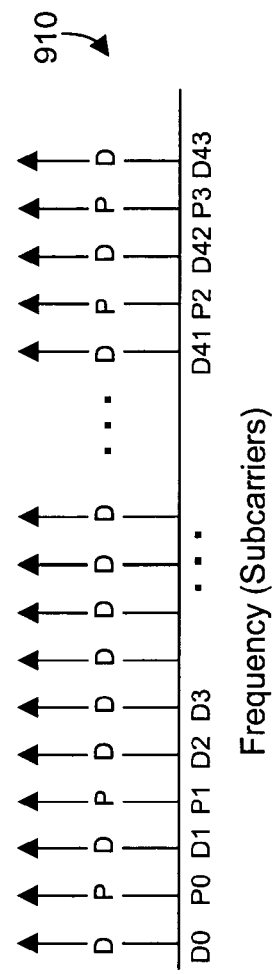
FIG. 9B is a graph diagram illustrating the subcarriers of FIG. 9A including 44 data subcarriers and four pilot tones.

FIG. 9B is a graph diagram illustrating the subcarriers 910 according to one embodiment of the dual packet configuration 900 utilizing 44 data subcarriers and four (4) pilot tones. In this configuration, there are 44 data subcarriers, denoted D0, D1, ... D43, and 4 pilot tones, denoted P0, P1, P2 and P3. As shown in FIG. 9B, the organization of the subcarriers 910 is a first data subcarrier D0, followed by a first pilot tone P0, followed by the second data subcarrier D1, which is then followed by the second pilot tone P1. Then, the data subcarriers D2 to D41 are sequentially placed in order, followed by the third pilot tone P2, the 43$^{rd}$ data subcarrier D42, the fourth pilot tone P3, and finally the last data subcarrier D43. The locations of the pilot tones can vary from that shown. The figure merely illustrates one possibility.

Figure 9C:
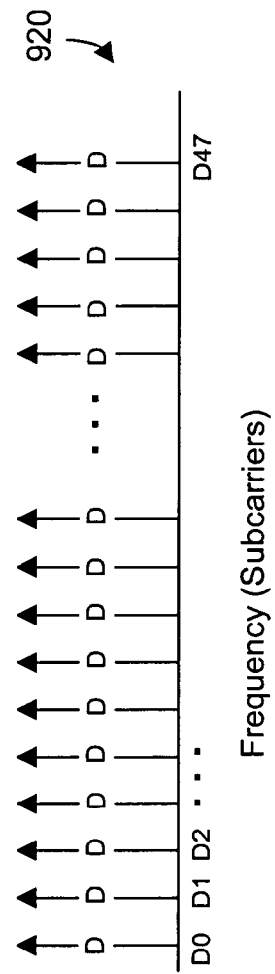
FIG. 9C is a graph diagram of an alternative subcarrier configuration for the packet configuration of FIG. 9 including 48 data subcarriers.

FIG. 9C is a graph diagram of an alternative subcarrier configuration 920 for the packet configuration 900 in which all 48 subcarriers are data subcarriers, denoted D0-D47. In this embodiment, there are no pilot tones, and the provided data rates are the same as that of 802.11a with 24 samples in the guard interval. However, if only 16 samples are utilized in a similar manner as shown in FIG. 8B, then slightly different data rates are achieved at the 22 MHz clock fundamental, where each respective data rate is multiplied by approximately 1.1.

Figure 10A:
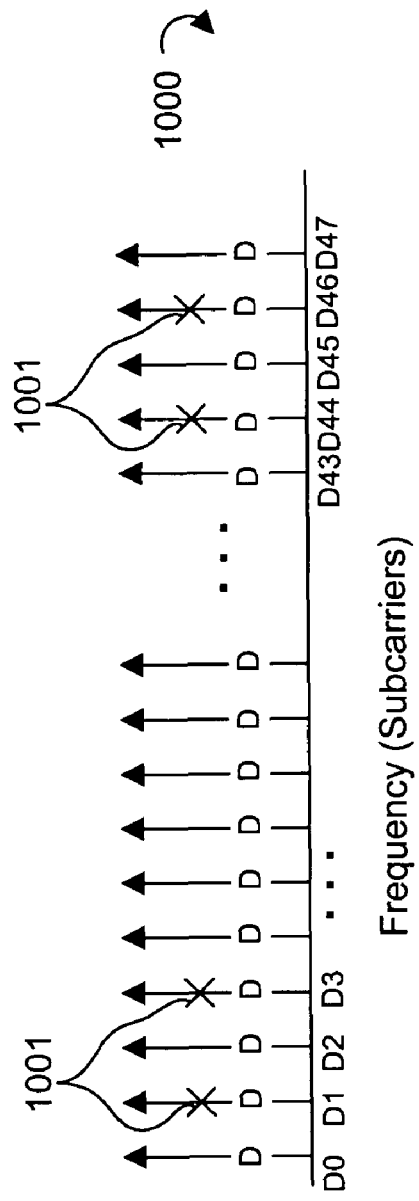
FIGS. 10A and 10B illustrate the packet configuration of FIG. 9 in which four of the 48 data subcarriers are replaced with pilot tones.
Figure 10B:
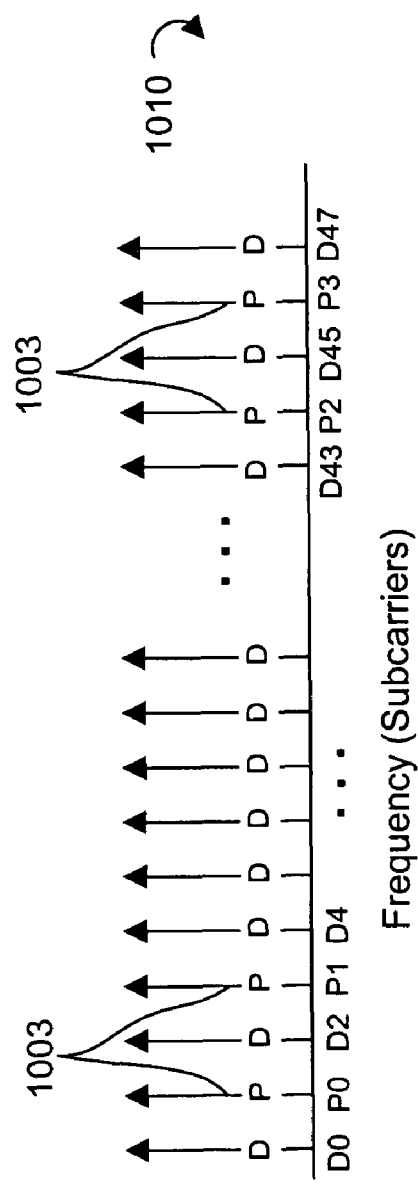

FIGS. 10A and 10B illustrate yet another alternative embodiment of the subcarrier configuration for the dual packet configuration 900 in which four data subcarriers are replaced with pilot tones. As shown in FIG. 10A, the 48 subcarriers are all data subcarriers denoted D0-D47. However, as shown at 1001, the data subcarriers D1, D3, D44 and D46 are punctured and discarded. As shown in FIG. 10B at 1003, the discarded data subcarriers are replaced with four pilot tones P0, P1, P2 and P3 respectively. The pilot tones are normally used to keep the phase lock loop (PLL) circuitry healthy. It is noted, however, that the PLL may track on the data carriers instead when no pilot tones are present. The discarded data is reconstructed, recreated or otherwise regenerated by the receiver using the received data that was not discarded. The data may be reconstructed using Error Correction Code (ECC) techniques or the like, such as utilizing forward error correction (FEC) or the like. The locations of the pilot tones can vary from that shown. The figure merely illustrates one possibility Another variation for all of the dual packet configuration 900 embodiments is to change the number of samples in the cyclic extension or guard interval between 24 and 16 samples in a similar manner as described previously for the dual packet configuration 700 and 800 as shown in FIGS. 7B and 8B. For the 48 subcarrier embodiments, changing the number of samples in the cyclic extension from 24 to 16 changes the OFDM symbol duration from 4 μsecs to 3.63637 μsecs. Furthermore, the resulting data rates may be changed from the 802.11a and 802.11b standards.

FIG. 11 is a table diagram illustrating comparisons of the various dual packet configurations described heretofore illustrating variations in data rates, OFDM symbol duration, spectral width, thermal noise performance and delay spread performance as a result of variations in the clock rates, number of subcarriers, number of pilot tones, and the number of samples in the cyclic extension or guard interval. The thermal noise performance is measured as energy per information bit (Eb) per noise density or strength (No) and is independent of bandwidth. Delay spread performance provides an indication of multipath-induced signal dispersion caused by echoes and reflections and is measured as root-mean-square delay spread (RMS DS). Each of the embodiments have an embodiment number from 1 to 9, followed by reference numbers illustrating the particular packet configuration. For example, embodiment 1 is configured according to packet configuration 500, embodiment 4 is configured according to packet configuration 900 with 48 data subcarriers of configuration 910 with 24 samples like configuration 710, and embodiment 9 is configured according to packet configuration 900 with 44 data subcarriers and data subcarrier puncture and pilot tone replacement of configurations 1000, 1010, with 16 samples as in configuration 810. Embodiment 1 utilizes 2 clock fundamentals of 20 and 22 MHz, whereas embodiments 2-9 utilize a single clock fundamental of 22 MHz. Embodiments 1, 2 and 3 utilize 52 subcarriers, whereas embodiments 4-9 utilize 48 subcarriers. Embodiments 1-4, 6, 7 and 9 utilize four pilot tones whereas embodiments 5 and 8 utilize no pilot tones. Embodiments 1, 3, 7, 8 and 9 utilize 16 samples in the guard interval, whereas embodiments 2, 4, 5 and 6 utilize 24 samples in the guard interval.

Embodiments 3, 7, 8 and 9 result in slightly modified OFDM symbol duration of approximately 3.64 μsecs. The spectral width for embodiment 1 is the same as that as 802.11a standard. Embodiments 2 and 3 exhibit 10% wider spectral width than 802.11a whereas embodiments 4-9 exhibit 0.83% wider spectral width than 802.11a. The thermal noise performance for embodiments 1, 3, 7 and 8 are approximately the same as that of 802.11a, whereas embodiments 2, 4-6 and 9 exhibit slightly worse noise performance than 802.11a. The delay spread performance for embodiment 1 is the same as that as 802.11a. Embodiments 2, 4, 5, and 6 exhibit 50% better delay spread performance as compared to 802.11a, whereas embodiments 3, 7, 8 and 9 exhibit 10% worse delay spread performance as compared to 802.11a.

Figure 12:
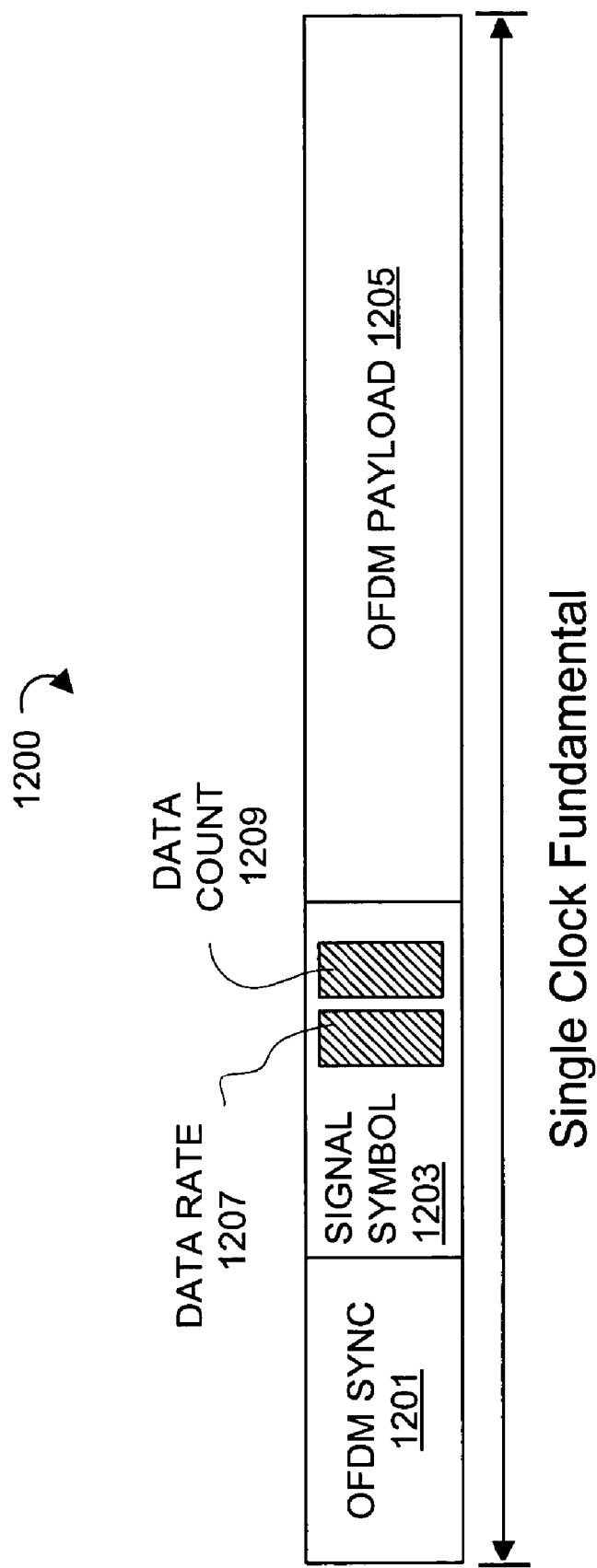
FIG. 12 is a graph diagram of an exemplary packet configuration according a super short OFDM preamble embodiment.

FIG. 12 is a graph diagram of an exemplary packet configuration 1200 according a super short mode of operation. In general, the first, serially modulated packet portions are dropped for the super short mode. In the embodiment shown, the packet configuration 1200 includes an OFDM sync pattern 1201, followed by an OFDM signal symbol 1203, followed by an OFDM payload 1205. It is understood that other parallel modulation techniques may be utilized. A data rate section 1207 and a data count section 1209 are provided in the signal symbol 1203. The data rate section 1207 is a bit field specifying the data rate, such as the standard 802.11a rates, and the data count section 1209 is a bit field indicative of the number of data bytes in the payload 1205. The packet configuration 1200 does not include a standard 802.11b header and is therefore incompatible and not otherwise interoperable or coexistent with 802.11b devices. The entire packet configuration 1200 utilizes a single clock source, such as 20 MHz, to simplify the transceiver circuitry. The packet configuration 1200 may be utilized by either of the devices 103, 105 within the area 101 to communicate with each other. However, the standard 802.11b devices 107, 109 are not compatible and may not coexist within the same area 101 as the devices 103, 105 utilizing the super short preamble option.

It is appreciated that a dual packet configuration for wireless communications according to at least one embodiment of the present invention enables compatibility with existing devices based on a serial modulation while enabling communication at different or higher data rates by using parallel modulation for the payload. In particular, the dual packet configuration includes a first portion that is modulated according to a serial modulation and a second portion that is modulated according to a parallel modulation. A dual packet configuration with a first portion comprising a preamble and header modulated with DSSS serial modulation according to 802.11b in the 2.4 GHz band enables dual mode devices to coexist in the same communication area as 802.11b compatible devices. The header includes a length field that specifies the duration of the second portion of the dual packet, so that 802.11b devices know how long to back off. The second portion modulated with a parallel modulation, such as OFDM or the like, enables the dual mode devices to communicate at different or higher rates, such as up to 54 Mbps or more, without interruption from the 802.11b devices.

In some embodiments, dual mode transmitters and receivers may each be capable of communicating in a super short mode in which only the second portion is utilized. The first, serial portion is not used, so that overall data throughput may be increased.

The super short mode is used only for dual mode devices and is generally not compatible with single mode devices. For example, the parallel modulation mode is not compatible with the serial modulation techniques utilized by the 802.11b devices, so that a dual mode device may not coexist or communicate in the same area as active 802.11b devices. For embodiments in which the serial modulation for the first packet portions are 802.11b compatible, the super short mode is advantageous when 802.11b devices are shut off or otherwise not active in the same area, so that the dual packet mode devices may be operated with enhanced data throughputs.

In other embodiments, the dual mode transmitters and receivers may each be capable of communicating in a standard mode in which the second portion is modulated according to the serial modulation. For example, this mode may be advantageous when the serial modulation is compatible with other devices, such as 802.11b devices. Thus, the dual mode devices may include the capability to communicate with the 802.11b devices in standard mode at the standard 802.11b rates, while also able to communicate with other dual mode devices at different or higher data rates.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. An apparatus comprising:
 a transmitter configured to transmit a packet comprising a preamble, a header, a synchronization pattern, and a payload and to modulate a first portion of the packet comprising the preamble and the header according to a serial modulation scheme and to modulate a second portion of the packet comprising the synchronization pattern and the payload according to an orthogonal frequency division multiplexing (OFDM) modulation scheme.

2. The apparatus of claim 1, wherein the preamble comprises a long preamble.

3. The apparatus of claim 1, wherein the preamble comprises a short preamble.

4. The apparatus of claim 1, wherein the header comprises an OFDM mode bit.

5. The apparatus of claim 4, wherein the header further comprises a length field indicating a duration of the second portion of the packet.

6. The apparatus of claim 1, wherein the second portion comprises:
 the synchronization pattern which comprises an OFDM synchronization pattern;
 an OFDM signal symbol, wherein the OFDM signal symbol comprises a data rate section and a data count section; and
 the payload which comprises an OFDM payload.

7. The apparatus of claim 1, wherein the first portion is based on a first clock fundamental, and wherein the second portion is based on a second clock fundamental.

8. The apparatus of claim 7, wherein the first clock fundamental is approximately 22 Megahertz (MHz) and the second clock fundamental is approximately 20 MHz.

9. The apparatus of claim 1, wherein the first and second portions are based on a single clock fundamental.

10. The apparatus of claim 9, wherein the second portion comprises OFDM symbols, and wherein an OFDM symbol comprises a guard interval comprising a standard quantity of samples for a given OFDM modulation scheme.

11. The apparatus of claim 9, wherein the second portion comprises OFDM symbols, and wherein an OFDM symbol comprises a guard interval comprising a quantity of samples greater than a standard number of samples for a given OFDM modulation scheme.

12. The apparatus of claim 1, wherein the second portion comprises OFDM symbols, and wherein an OFDM symbol comprises a set of frequency subcarriers, and wherein the quantity of frequency subcarriers in the set is less than a standard number of frequency subcarriers for a given OFDM modulation scheme.

13. The apparatus of claim 12, wherein an OFDM symbol comprises 48 frequency subcarriers.

14. The apparatus of claim 12, wherein a frequency subcarrier is a data subcarrier.

15. The apparatus of claim 12, wherein a frequency subcarrier comprises at least one pilot tone.

16. The apparatus of claim 12, wherein each of the frequency subcarriers comprises a data subcarrier, and wherein the transmitter discards a subset of the data subcarriers and replaces each discarded data subcarrier with a pilot tone.

17. The apparatus of claim 1, wherein the serial modulation scheme is direct sequence spread spectrum (DSSS).

18. The apparatus of claim 1, wherein the first portion of the packet is universally decodable and the second portion of the packet is selectively decodable.

19. An apparatus comprising:
a receiver configured to receive a packet comprising a preamble, a header, a synchronization pattern, and a payload, wherein the packet comprises a first portion and a second portion, the first portion comprising the preamble and the header and having been modulated according to a serial modulation scheme,. and the second portion comprising the synchronization pattern and the payload and having been modulated according to orthogonal frequency division multiplexing (OFDM).

20. The apparatus of claim 19, wherein the first portion comprises the header with an OFDM mode bit.

21. The apparatus of claim 20, wherein the header further comprises a length field indicating the duration of the second portion.

22. The apparatus of claim 19, wherein the first portion is based on a first clock fundamental and the second portion is based on a second clock fundamental.

23. The apparatus of claim 22, wherein the first clock fundamental is approximately 22 Megahertz (MHz) and the second clock fundamental is approximately 20 MHz.

24. The apparatus of claim 19, wherein the first portion and the second portion are modulated according to the same clock fundamental.

25. The apparatus of claim 24, wherein the second portion includes OFDM symbols, and wherein an OFDM symbol comprises a guard interval comprising a standard number of samples for a given OFDM modulation scheme.

26. The apparatus of claim 24, wherein the second portion comprises OFDM symbols, and wherein an OFDM symbol comprises a guard interval comprising an increased number of samples compared to standard OFDM modulation.

27. The apparatus of claim 24, wherein the second portion comprises OFDM symbols, and wherein an OFDM symbol comprises a reduced number of frequency subcarriers compared to standard OFDM modulation.

28. The apparatus of claim 27, wherein a frequency subcarrier is a data subcarrier.

29. The apparatus of claim 27, wherein the frequency subcarriers include at least one pilot tone.

30. The apparatus of claim 27, wherein at least one data subcarrier in an OFDM symbol has been discarded and replaced with a corresponding pilot tone, and wherein the receiver is configured to regenerate the at least one discarded data subcarrier based on other received data subcarriers.

31. The apparatus of claim 19, wherein the receiver is configured to process a received packet based on the second portion of the received packet.

32. The apparatus of claim 19, wherein the receiver is configured to operate in the 2.4 Gigahertz frequency band.

33. The apparatus of claim 19, wherein the serial modulation scheme is direct sequence spread spectrum (DSSS).

34. The apparatus of claim 19, wherein the first portion of the packet is universally decodable and the second portion of the packet is selectively decodable.

35. A method comprising:
modulating, at a transmitter, a packet comprising a preamble, a header, a synchronization pattern, and a payload, wherein the packet comprises a first portion and a second portion, wherein the first portion comprises the preamble and the header and is modulated by a first modulator according to a serial modulation scheme, and wherein the second portion comprises the synchronization pattern and the payload and is modulated by a second modulator according to an orthogonal frequency division multiplexing (OFDM) modulation scheme.

36. The method of claim 35, wherein the header comprises an OFDM mode bit and a length field, and wherein the length field indicates a duration of the second portion of the packet.

37. The method of claim 35, wherein modulating the first portion of the packet comprises modulating the first portion of the packet based on a first clock fundamental, and wherein modulating the second portion of the packet comprises modulating the second portion of the packet based on a second clock fundamental.

38. The method of claim 35, wherein modulating the first and second portions of the packet comprises modulating the first and second portions of the packet based on a single clock fundamental.

39. The method of claim 38, wherein the second portion of the packet comprises a guard interval with a standard number of samples, according to a given OFDM modulation scheme, for an OFDM symbol.

40. The method of claim 38, wherein the second portion of the packet comprises a guard interval with an increased number of samples, compared to a given OFDM modulation scheme, for an OFDM symbol.

41. The method of claim 38, further comprising removing a selected one or more frequency subcarriers from an OFDM symbol.

42. The method of claim 41, further comprising:
replacing the selected one or more data subcarriers with a corresponding pilot tone for transmission; and
regenerating the replaced data subcarriers based on received data.

43. The method of claim 35, further comprising processing a received packet based on the second portion of the received packet.

44. The method of claim 35, wherein the serial modulation scheme is direct sequence spread spectrum (DSSS).

45. The method of claim 35, wherein the first portion is configured to be universally decoded, and wherein the second portion is configured to be selectively decoded.

46. An article of manufacture including a non-transitory computer-readable medium having instructions stored thereon that, if executed by a computing device, cause the computing device to perform operations comprising:
modulating a packet comprising a preamble, a header, a synchronization pattern, and a payload, wherein the packet comprises a first portion and a second portion, wherein the first portion comprises the synchronization pattern and the payload and is modulated according to a serial modulation scheme, and wherein the second portion comprises the synchronization pattern and the payload and is modulated according to an orthogonal frequency division multiplexing (OFDM) modulation scheme.

47. The article of manufacture of claim 46, wherein the header comprises an OFDM mode bit and a length field, and wherein the length field indicates a duration of the second portion of the packet.

48. The article of manufacture of claim 46, wherein modulating the first portion of the packet comprises modulating the first portion of the packet based on a first clock fundamental, and wherein modulating the second portion of the packet comprises modulating the second portion of the packet based on a second clock fundamental.

49. The article of manufacture of claim 46, wherein modulating the first and second portions of the packet comprises modulating the first and second portions of the packet based on a single clock fundamental.

50. A system comprising:
a first device including a transmitter configured to:
    modulate a first portion of a packet comprising a preamble and a header according to a serial modulation scheme;
    modulate a second portion of the packet comprising a synchronization pattern and a payload according to an orthogonal frequency division multiplexing (OFDM) modulation scheme; and
    transmit the packet to a second device, wherein the packet comprises the modulated first portion and the modulated second portion; and
the second device including a receiver configured to receive the packet.

* * * * *

UNITED STATES PATENT AND TRADEMARK OFFICE
CERTIFICATE OF CORRECTION

PATENT NO.         : 8,194,530 B2                                    Page 1 of 1
APPLICATION NO.    : 11/849579
DATED              : June 5, 2012
INVENTOR(S)        : Mark A. Webster It is certified that error appears in the above-identified patent and that said Letters Patent is hereby corrected as shown below:

Column 16-17, lines 56-68 (Col. 16), lines 1-2 (Col. 17) delete

"46. An article of manufacture including a non-transitory computer-readable medium having instructions stored thereon that, if executed by a computing device, cause the computing device to perform operations comprising: modulating a packet comprising a preamble, a header, a synchronization pattern, and a payload, wherein the packet comprises a first portion and a second portion, wherein the first portion comprises the synchronization pattern and the payload and is modulated according to a serial modulation scheme, and wherein the second portion comprises the synchronization pattern and the payload and is modulated according to an orthogonal frequency division multiplexing (OFDM) modulation scheme." AND INSERT --46. An article of manufacture including a non-transitory computer-readable medium having instructions stored thereon that, if executed by a computing device, cause the computing device to perform operations comprising: modulating a packet comprising a preamble, a header, a synchronization pattern, and a payload, wherein the packet comprises a first portion and a second portion, wherein the first portion is modulated according to a serial modulation scheme, and wherein the second portion is modulated according to an orthogonal frequency division multiplexing (OFDM) modulation scheme.--

Signed and Sealed this
Twenty-third Day of October, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 8,194,530 B2 |
| APPLICATION NO. | : 11/849579 |
| DATED | : June 5, 2012 |
| INVENTOR(S) | : Webster et al. |

It is certified that error appears in the above-identified patent and that said Letters Patent is hereby corrected as shown below:

On Title Page 2, in Item (56), under "OTHER PUBLICATIONS", in Column 1, Line 15, delete "Decimiation" and insert -- Decimation --, therefor.

On Title Page 2, in Item (56), under "OTHER PUBLICATIONS", in Column 1, Line 20, delete "Incompatibilty" and insert -- Incompatibility --, therefor.

On Title Page 2, in Item (56), under "OTHER PUBLICATIONS", in Column 2, Line 1, delete ""SYnchronous" and insert -- "Synchronous --, therefor.

On Title Page 2, in Item (56), under "OTHER PUBLICATIONS", in Column 2, Line 12, delete "LAyer" and insert -- Layer --, therefor.

On Title Page 2, in Item (56), under "OTHER PUBLICATIONS", in Column 2, Line 19, delete "LAyer" and insert -- Layer --, therefor.

In the Drawings

In Fig. 11, Sheet 11 of 12, delete "Comparson" and insert -- Comparison --, as shown on the attached page.

In the Specification

In Column 5, Line 52, delete "rates" and insert -- rates. --, therefor.

In Column 12, Line 19, delete "possibility" and insert -- possibility. --, therefor.

In the Claims

In Column 15, Line 21, in Claim 19, delete "scheme,." and insert -- scheme, --, therefor.

Signed and Sealed this
Seventeenth Day of September, 2013

Teresa Stanek Rea
*Deputy Director of the United States Patent and Trademark Office*

Comparison of Embodiments

| Embod # | Provided Data Rates (Mbps) | Clock Rate (MHz) | # of Sub-carriers | # of Pilot Tones | # Samples Cyclic Ext. | # Samples FFT | OFDM Symbol Duration (μsecs) | Spectral Width (relative to 802.11a) | ThermalNoise Performance (Eb/No dB) (relative to 802.11a) | Delay Spread Performance (RMS DS) (relative to 802.11a) | Comments |
|---|---|---|---|---|---|---|---|---|---|---|---|
| 1 (500) | 6, 9, 12, 18, 24, 36, 48, 54 | 20 | 52 | 4 | 16 | 64 | 4 | same | same | 802.11a | Clock switch between 20 & 22 MHz |
| 2 (700) | 6, 9, 12, 18, 24, 36, 48, 54 | 22 | 52 | 4 | 24 | 64 | 4 | 10% wider | 0.5 dB worse | 50% better | Clock switch not required; Added samples to cyclic extension |
| 3 (800) | 6.6, 9.9, 13.2, 19.8, 26.4, 39.6, 52.8, 59.4 | 22 | 52 | 4 | 16 | 64 | 3.63637 | 10% wider | same | 10% worse | 802.11a run at 22 MHz; 10% increase in data rates |
| 4 (900, 710, 910) | 5.5, 8, 25, 11, 16.5, 22, 33, 44, 49.5 | 22 | 48 | 4 | 24 | 64 | 4 | 0.83% wider | 0.5 dB worse | 50% better | 44 data sub-carriers; Added samples to cyclic extension |
| 5 (900, 710, 920) | 6, 9, 12, 18, 24, 36, 48, 54 | 22 | 48 | 0 | 24 | 64 | 4 | 0.83% wider | 0.5 dB worse | 50% better | 48 data sub-carriers; No pilots; Added samples to cyclic extension |
| 6 (900, 710, 1000, 1010) | 6, 9, 12, 18, 24, 36, 48, 54 | 22 | 48 | 4 | 24 | 64 | 4 | 0.83% wider | 0.9 dB worse | 50% better | Puncture 4 of the 48 data sub-carriers Replace with 4 pilots; Added samples to cyclic extension |
| 7 (900, 810, 910) | 6.05, 9.075, 12.1, 18.15, 24.2, 36.3, 48.4, 54.45 | 22 | 48 | 4 | 16 | 64 | 3.63637 | 0.83% wider | same | 10% worse | 44 data sub-carriers 4 pilots |
| 8 (900, 810, 920) | 6.6, 9.9, 13.2, 19.8, 26.4, 39.6, 52.8, 59.4 | 22 | 48 | 0 | 16 | 64 | 3.63637 | 0.83% wider | same | 10% worse | 48 data sub-carriers. No pilots |
| 9 (900, 810, 1000, 1010) | 6.6, 9.9, 13.2, 19.8, 26.4, 39.6, 52.8, 59.4 | 22 | 48 | 4 | 16 | 64 | 3.63637 | 0.83% wider | 0.4 dB worse | 10% worse | Puncture 4 of the 48 data sub-carriers Replace with 4 pilots |

FIG. 11